United States Patent

[11] 3,591,161

| [72] | Inventors | William A. Scheublein, Jr. Ballwin; Louis P. Fister, St. Louis, both of, Mo. |
|---|---|---|
| [21] | Appl. No | 819,132 |
| [22] | Filed | Apr. 25, 1969 |
| [45] | Patented | July 6, 1971 |
| [73] | Assignee | Moog Industries, Inc. St. Louis, Mo. |

[54] SPRING SPACER
3 Claims, 7 Drawing Figs.

| [52] | U.S. Cl. | 267/61 |
|---|---|---|
| [51] | Int. Cl. | F16f 1/12 |
| [50] | Field of Search | 267/615 |

[56] References Cited
UNITED STATES PATENTS

| 2,801,841 | 8/1957 | Blythe | 267/61 (S) |
|---|---|---|---|
| 3,198,508 | 8/1965 | Melton et al | 267/61 (S) |

*Primary Examiner*—James B. Marbert
*Attorney*—Gravely, Lieder & Woodruff

ABSTRACT: A spacer for expanding coil springs has a body provided with grooves at each end. One of the grooves freely accepts a convolution of the spring, while the other groove has a finger curved over it for capturing an adjacent spring convolution therein so that the spacer follows the movement of the adjacent convolution. Entrance to the second groove is obtained through a reduced slot located between the body and the end of the finger. When a convolution is forced against the body and finger at the slot, the finger spreads and permits the convolution to enter the slot.

PATENTED JUL 6 1971

3,591,161

INVENTORS:
WILLIAM A. SCHEUBLEIN, JR.
LOUIS P. FISTER
BY
Gravely, Lieder & Woodruff
ATTORNEYS.

SPRING SPACER

BACKGROUND OF THE INVENTION

This invention relates in general to means for expanding springs, and more particularly to spacers suitable for installation in coil springs.

Automotive coil springs, after extended use, tend to lose their original height, or as it is more commonly expressed, they tend to sag. This sagging effect not only detracts from the vehicle's appearance, but much worse, it adversely affects the vehicle's performance. For example, when the front suspension is supported by fatigued springs, the lower suspension arm and steering knuckle are normally not presented at the angle which affords the optimum steering control and tire wear. Furthermore, they permit the automobile to lean excessively when curves are negotiated and to dip excessively when the brakes are applied. In addition, fatigued springs allow the vehicle suspension to bottom out when subjected to moderate shocks which would be fully absorbed by normal springs. Heretofore, spring spacers or lifters have been developed to overcome these problems, but most spring spacers of current manufacture are held in place merely by the compressive forces exerted on them by adjacent spring convolutions. Consequently, during the dynamic loading encountered in service, they tend to shift circumferentially on the convolutions. Many of the spring spacers of current manufacture are, furthermore, difficult to install in the confined spaces surrounding automotive suspension systems.

SUMMARY OF THE INVENTION

One of the principal objects of the present invention is to provide a spacer which may be installed in an automotive coil spring to expand and to restore the compressed spring to substantially its original height. Another object is to provide a spacer which is easily installed in springs located within confined spaces. Still another object is to provide a spacer which will remain intact and in place when the spring is subjected to severe shocks in both compression and rebound. These and other objects and advantages will become apparent hereinafter.

The present invention resides in a spacer for expanding coil springs and having grooves extending across it. One of the grooves freely accepts a convolution of the spring while the other groove is associated with retention means for capturing an adjacent spring convolution in that groove. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION OF PREFERRED EMBODIMENT

Figures 1, 2, 3:
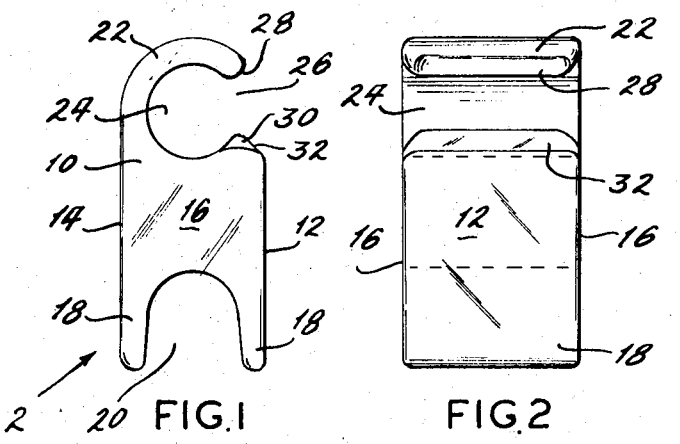
FIG. 1 is a side elevational view of a spacer constructed in accordance with and embodying the present invention.
FIG. 2 is a front elevational view of the spacer.
FIG. 3 is a bottom plan view of the spacer.

Referring now to the drawings, 2 designates a spacer for installation in a coil spring 4 between adjacent convolutions 6 and 8 thereof. The spacer 2 is preferably molded from a plastic substance capable of withstanding high impact and compressive forces. Marlex 043065 Polyolefin marketed by the Phillips Petroleum Company is suitable for this purpose.

The exact configuration of the spacer 2 is best illustrated in FIGS. 1—3. In particular, the spacer 2 includes a straight shank or body portion 10 having a front face 12 and a rear striking face 14 as well as side faces 16. At its lower end the shank 10 merges into a pair of generally parallel retention arms 18 which project downwardly and partially define a U-shaped lower socket or groove 20, the ends of which open outwardly through the side faces 16. The radius of the groove 20 is slightly larger than the radius of the wire from which the spring 4 is coiled. Similarly, the opposed inwardly presented surfaces of the arms 18 beyond the bight portion of the groove 20 are spaced apart a distance slightly greater than the diameter of the spring wire so that the groove 20 freely receives the spring wire forming the convolution 8.

The opposite end of the shank 10 along the rear face 12 merges into an arcuate finger 22 which curves upwardly therefrom and loops over an upper socket or groove 24 generally circular cross-sectional shape. The axis of the upper groove 24 is parallel to the axis of the lower groove 20 and, similarly, it opens outwardly at its ends through the side faces 16. The upper groove 24 possesses a radius which is slightly smaller than the diameter of the spring wire. Access to the groove 24 is obtained through a laterally opening slot entrance or 26 which is bounded on one side by a curved end surface 28 on the end of the finger 16 and on its other side by a ridge 30 formed by the intersection of the curved surface of the groove 24 and a camming surface 32 inclined inwardly from the adjacent front face 12 on the shank 10. The width of the slot 26 is less than the diameter of the groove 24, while the thickness of the finger 22 and the resiliency of the material from which the spacer 2 is formed are both such that the finger 22 can, without permanent deformation, be spread outwardly at least to a position wherein the width of the slot 26 equals the diameter of the spring wire. Consequently, the convolution 6 may be inserted into the upper groove 24 by spreading the arcuate finger 22. Since the diameter of the groove 24 is less than the diameter of the spring wire, the finger 22 will tightly grip the convolution 6 and resist circumferential movement of the spacer 2.

INSTALLATION AND OPERATION

Figure 5:
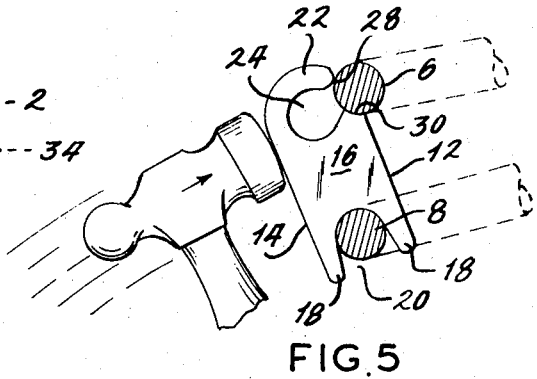
FIG. 5 is an elevational view showing a spacer being installed between the convolutions of a spring.
Figure 4:
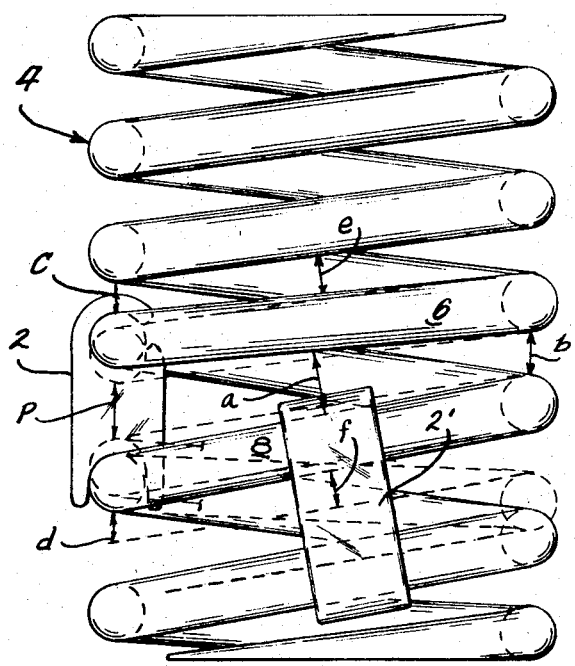
FIG. 4 is a side elevational view of a coil spring having two spacers installed in it.

To install the spacer 2 on the spring 4, the latter is first expanded by jacking up the side of the automobile on which it is located. Next, the spacer 2 is oriented such that its front face 12 faces upwardly, and with the lower groove 20 aligned with the convolution 8, the spacer 2 is advanced toward the spring 4 until the convolution 8 enters the groove 20. The spacer 2 is then pivoted upwardly about the convolution 8 as far as possible (FIG. 5), in which case the upper convolution 6 will be presented opposite to the slot 26 and will bear against the curved end surface 28 on the finger 22 or the camming surface 32 on the ridge 30 or ideally both. In this connection, it should be noted that the spacers 2 may be manufactured in different sizes, that is, with shanks 10 of varying lengths and grooves 20 and 24 of varying diameters, to accommodate springs of different automobiles. While the spacer 2 is held against the upper convolution 6, in the position previously noted, it is struck with a hammer on its rear striking face 14. The impact, of course, drives the upper end of the spacer 2 still further inwardly and urges the arcuate surface of the convolution 6 across the camming surface 32 and the curved end surface 28. This, in turn, spreads the finger 22 away from the ridge 30 and allows the convolution 6 to pass into the groove 24. Once the convolution 6 enters the groove 24, the finger 22, by reason of its natural resiliency, snaps back toward its initial position so that the convolution 6 is tightly gripped by the finger 22 and is captured within the upper groove 24 (FIG. 4). Since the retention arms 18 flank the flower convolution 8, that convolution is also captured within the lower groove 20 and, consequently, radial movement of the spacer 2, either inwardly or outwardly with respect to the spring 4, is precluded.

When the vehicle is again lowered, the spacer 2 is compressed tightly between the convolutions 6 and 8 and thereby prevents those convolutions from approaching one another as close as do other convolutions within the spring 4. Accordingly, the compressed length of the spring 4 is slightly greater and the chassis of the vehicle rides slightly higher. Since the finger 22 retains the convolution 6 in the upper groove 24, the spacer 2 will not shift appreciably or fall out during rebound. Moreover, the finger 22 grips the convolution 6 and spaces the convolutions 6 and 8 in a manner which prevents significant circumferential movement of the spacer 2.

In most applications, a single-spring spacer 2 does not produce sufficient expansion of the spring 4 to restore the chassis of the vehicle to its original height. Therefore, it is desirable to employ a pair of spacers 2 and 2' (FIG. 4) on each spring 4. Normally, a single spacer 2 at point P on the spring 4 will deflect the convolution 6 toward the convolution above it and the convolution 8 toward the one below it. Since the first spacer 2 spreads the convolutions 6 and 8, little advantage is gained by inserting another spacer 2' between those convolutions 6 and 8 at point $a$ spaced 90° from the first spacer 2 or, for that matter, even at point $b$ spaced 180° from the first spacer 2. At the latter point, the spacing between the convolutions 6 and 8 approximates the spacing between the remaining convolutions of the spring 4. Moreover, on most front end constructions of current manufacture, access to points spaced 180° apart on coil springs 4 is impossible.

On the other hand, the spread between convolutions 6 and 8 and their adjacent upper and lower convolutions, respectively, is a minimum directly above and below the first spacer 2. Accordingly, to achieve maximum expansion of the spring 4, the second spacer 2' should be inserted either above or below the first spacer 2 at points $c$ or $d$. A pair of spacers 2 and 2' arranged in this manner, however, would distort the spring column too much which, in turn, would create excessive stresses within the spring 4.

Optimum results are obtained when the second spacer 2' is spaced approximately 90° (FIG. 4) from the first spacer, either at point $e$ between the convolution 6 and the adjacent convolution above it or at point $f$ between the convolution 8 and the adjacent convolution below it. At these locations the spread created between the foregoing pairs of convolutions by the first spacer 2 is less than the spacing between the remaining convolutions of the spring 6, yet the presence of a second spacer 2' at these locations will not impart an inordinate amount of column distortion.

Figure 6:
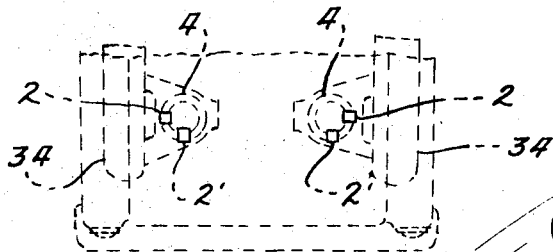
FIG. 6 is a fragmentary plan view showing the suspension system of an automobile and spacers installed in the springs of the suspension system.

Normally, the first spacer 2 is installed in the spring 4 such that its striking face 14 faces laterally or to the side of the vehicle (FIG. 6). Access to this point $a$ on the spring is gained by removing the wheel 34 adjacent to it. The second spacer 2' is normally installed in the front of the spring 4 such that its striking face 14 faces forwardly. When installed in this manner on front coil springs 4 of a vehicle, the first or lateral spacers 2 are positioned best for preventing excessive body roll as the vehicle negotiates sharp corners, while the second or forward spacers 2' are positioned best for preventing excessive dipping when the brakes are applied.

Inasmuch as the lower groove 20 is open at its bottom, neither the shank 10 nor the finger 22 will be subjected to tensile stresses during rebound movement of the spring 4. On the contrary, the arms 18 will merely slide against the sides of the convolutions 8, allowing the entire spacer 2 to follow the upper convolution 6. Thus, the finger 22 retains the spacer 2 firmly attached to the spring 4 at the selected point on the convolution 6, and this normally prevents circumferential movement of the spacer along spring 4.

MODIFIED EMBODIMENT

When the first and second spacers 2 and 2' in each coil spring 4 are spaced 90° apart at points P and $f$, respectively, the spread between the convolutions 6 and 8 will tend to increase beyond the portion of the convolution 8 which is interposed between the two spacers 2 and 2'. Similarly, the spread between the convolution 8 and the adjacent convolution below it will tend to increase beyond that same portion of the convolution 8 interposed between the spacers 2 and 2'. On the other hand, the spread between the convolutions separated by the first spacer 2 at point P tends to diminish in the direction of the second spacer 2', while the spread between the two convolutions separated by the second spacer 2' at point $f$ tends to diminish in the direction of the first spacer 2. When the spring 4 with the two spacers 2 and 2' installed at points P and $f$ is subjected to dynamic loading, this spring distortion tends to wedge the spacers 2 away from one another or in other words, in a direction in which the spread between the respective convolutions separated by those spacers 2 is greater. Theoretically, the spacer 2' would move to a position 180° from the spacer 2, absent obstructions on the surfaces of the convolutions. The same would be true if the second spacer 2' was installed at point $e$.

On the other hand, if the second spacer 2' was located at point $a$ between the convolutions 6 and 8, the spread between those convolutions would diminish beyond the portions thereof which are interposed between and rendered inactive by those spacers 2 and 2'. Accordingly, when installed in this manner, the two spacers 2 and 2' would tend to move toward one another.

This problem is not particularly critical when the surfaces of the convolutions are relatively rough, as would be the case with a rusted spring 4. In such an instance, a limited amount of movement would occur, but this movement would never reach the theoretical maximum. On the contrary, the high amount of friction induced by the rusted surface would prevent it.

Figure 7:
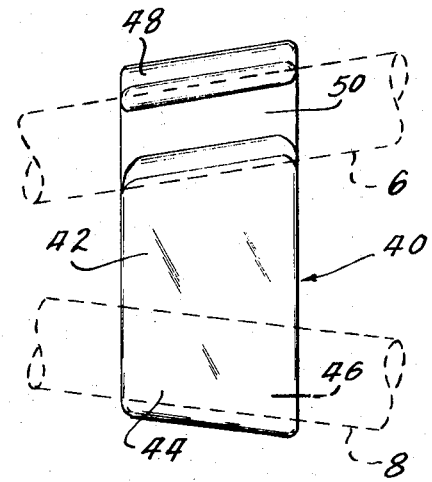
FIG. 7 is a front elevational view of a modified spacer.

Nevertheless, the tendency of the spacers 2 and 2' to move relative to one another can be greatly reduced by forming the upper and lower grooves such that their axial centerlines converge toward one another at generally the same angle as the angle between the adjacent convolutions separated by them. In particular, as will be seen by reference to FIG. 7, it is possible to provide a modified spacer 40 having a shank or body 42 provided at its lower end with retention arms 44 which define a lower groove 46. At its opposite end the shank 42 merges into an arcuate finger 48 which curves over an upper groove 50. The grooves 46 and 50, like the grooves 20 and 24, are cylindrical, but they are presented at equal and opposite angles with respect to the side faces of the shank 42 so that their axial centerlines converge toward one another at the approximate angle of convergence for the spread convolutions when the spring 4 is under normal loading. When the spring 4 with two spacers 40 spaced 90° apart is loaded the canted convolutions will bear with equal force along the grooves 46 and 50, and consequently the spacers 40 remain in place.

This invention is intended to cover all changes and modifications of the examples of the invention herein chosen for purposes of the disclosure which do not constitute departures from the spirit and scope of the invention.

What we claim is:

1. A spacer device for use with a coil suspension spring for vehicles in which adjacent coil convolutions expand and contract with spring reaction to vehicle road surface response, are normally inclined as the convolutions advance spirally from end to end, and in which the spring heighth decreases from its initial heighth with age; said spacer device substantially restoring initial spring heighth under static loading conditions and comprising an elongated body having 1. a spring convolution gripping socket formed in one end to snap fit over a coil convolution,
      a. said socket having an entrance opening laterally of said body and being closed from the end of said body so as to fit over, grip and move with the said convolution during the spring reaction to vehicle road surface response, and
   2. an axially open alignment socket at its opposite end defined by a. projecting legs spaced apart to receive the convolution of the coil adjacent to said first-mentioned coil convolution,
b. said legs being free to slide vertically on the coil convolution during spring reaction to vehicle road surface response,
c. said alignment socket having a depth at least equal to the diameter of said coil, whereby said gripping socket holds said body in place on the coil suspension spring and said alignment socket holds said body between said adjacent coil convolutions and permits unrestricted movement of the coil positioned between said projecting legs in a direction away from the coil on which the gripping socket is positioned.

2. A spacer according to claim 1 wherein said sockets have semicylindrical surfaces, each surface having a radius substantially equal to the radius of the spring wire; and wherein the axial centerlines of the sockets are substantially parallel.

3. A spacer according to claim 1 wherein said sockets have semicylindrical surfaces each surface having a radius substantially equal to the radius of the spring wire; and wherein the axial centerlines of the sockets converge.